(12) United States Patent
Green et al.

(10) Patent No.: US 8,479,214 B2
(45) Date of Patent: Jul. 2, 2013

(54) HARDWARE THROUGHPUT SATURATION DETECTION

(75) Inventors: Dustin L. Green, Redmond, WA (US); Yau Ning Chin, Seattle, WA (US); Bruce L. Worthington, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 858 days.

(21) Appl. No.: 12/242,621

(22) Filed: Sep. 30, 2008

(65) Prior Publication Data

US 2010/0083274 A1    Apr. 1, 2010

(51) Int. Cl.
*G06F 13/00* (2006.01)
(52) U.S. Cl.
USPC .......................................... 718/105; 718/101
(58) Field of Classification Search
None
See application file for complete search history.

(56) References Cited

U.S. PATENT DOCUMENTS

| | | | |
|---|---|---|---|
| 5,175,679 A | 12/1992 | Allen et al. | |
| 5,506,975 A | 4/1996 | Onodera | |
| 5,535,418 A | 7/1996 | Suzuki | 395/845 |
| 5,655,120 A | 8/1997 | Witte et al. | |
| 5,948,081 A | 9/1999 | Foster | 710/40 |
| 6,032,200 A | 2/2000 | Lin | |
| 6,272,565 B1 | 8/2001 | Lamberts | 710/43 |
| 6,292,856 B1 | 9/2001 | Marcotte | 710/39 |
| 6,356,917 B1 | 3/2002 | Dempsey et al. | |
| 6,557,055 B1 * | 4/2003 | Wiese | 710/36 |
| 6,877,049 B1 | 4/2005 | Myers | 710/56 |
| 6,971,097 B1 | 11/2005 | Wallman | |
| 7,162,550 B2 | 1/2007 | Douglas | 710/35 |
| 7,225,293 B2 | 5/2007 | Lamberts | 711/112 |
| 8,346,995 B2 | 1/2013 | Green et al. | |
| 2003/0084151 A1 | 5/2003 | Simpson et al. | |
| 2004/0143687 A1 | 7/2004 | Cox | 710/5 |
| 2005/0060704 A1 | 3/2005 | Bulson et al. | |
| 2005/0144332 A1 | 6/2005 | Nellitheertha | |
| 2006/0017953 A1 * | 1/2006 | Ly et al. | 358/1.13 |
| 2006/0020700 A1 * | 1/2006 | Qiu et al. | 709/224 |
| 2006/0037018 A1 | 2/2006 | Fang et al. | |
| 2006/0045139 A1 * | 3/2006 | Black et al. | 370/516 |
| 2006/0182030 A1 * | 8/2006 | Harris et al. | 370/230 |
| 2006/0187970 A1 * | 8/2006 | Lee et al. | 370/516 |
| 2006/0242648 A1 | 10/2006 | Guccione et al. | |
| 2007/0083727 A1 * | 4/2007 | Johnston et al. | 711/170 |
| 2007/0206645 A1 * | 9/2007 | Sundqvist et al. | 370/516 |

(Continued)

OTHER PUBLICATIONS

Schmookler, et al., "A Low-power, High-speed Implementation of a PowerPC™ Microprocessor Vector Extension," http://cobweb.een.purdue.edu/~arch/seminar/schedules/spring00-pdf/schmookler99.pdf, downloaded 2008, 8 pages.

*Primary Examiner* — Eric Coleman
(74) *Attorney, Agent, or Firm* — Woodcock Washburn, LLP

(57) ABSTRACT

Improved hardware throughput can be achieved when a hardware device is saturated with IO jobs. Throughput can be estimated based on the quantifiable characteristics of incoming IO jobs. When IO jobs are received a time cost for each job can be estimated and stored in memory. The estimates can be used to calculate the total time cost of in-flight IO jobs and a determination can be made as to whether the hardware device is saturated based on completion times for IO jobs. Over time the time cost estimates for IO jobs can be revised based on a comparison between the estimated time cost for an IO job and the actual time cost for the IO job using aggregate IO job completion sequences.

20 Claims, 9 Drawing Sheets

U.S. PATENT DOCUMENTS

| | | |
|---|---|---|
| 2007/0288224 A1 | 12/2007 | Sundarrajan et al. |
| 2008/0016508 A1 | 1/2008 | Goto et al. |
| 2008/0046609 A1* | 2/2008 | Shum et al. .................... 710/33 |
| 2008/0066070 A1 | 3/2008 | Markov et al. |
| 2008/0086733 A1 | 4/2008 | Jensen et al. |
| 2008/0155087 A1* | 6/2008 | Blouin et al. ................ 709/223 |
| 2008/0172441 A1* | 7/2008 | Speicher et al. .............. 709/201 |
| 2009/0210876 A1 | 8/2009 | Shen et al. |

\* cited by examiner

HARDWARE THROUGHPUT SATURATION DETECTION

CROSS REFERENCE TO RELATED APPLICATIONS

This application is related to U.S. patent application Ser. No. 12/242,615 entitled "TEMPORAL BATCHING OF I/O JOBS" filed Sep. 30, 2008 and incorporated by reference in its entirety; U.S. application Ser. No. 12/242,624 entitled "BALANCING USAGE OF HARDWARE DEVICES AMONG CLIENTS" filed Sep. 30, 2008 and incorporated by reference in its entirety.

BACKGROUND

Virtualization provides techniques for consolidating physical machines. That is, multiple virtual machines can be executed by a single physical machine. When servers are consolidated, a problem exists in how the virtual machines access the physical hardware. For example, if 5 virtual machines are effectuated by software instructions each one of them may attempt to access a physical hardware device such as a storage device, network adaptor, etc. The hardware device many not be able to efficiently support this many requesters and one or more of the virtual machines may experience resource starvation, e.g., the instance where the virtual machine is denied resources and its requests experience high latency. This is due to the fact that hardware devices are not configured to process information that identifies which IO jobs are from which virtual machine. The hardware device of course does not select IO jobs to complete in an arbitrary order, it selects IO jobs to maximize throughput and because of this certain IO jobs may sit in the device's buffer for an unacceptable length of time. For example, a driver for a hardware device such as a storage device may complete 200 IO jobs from a first virtual machine before completing 8 IO jobs from a second virtual machine because completing the 200 IO jobs may allow the hardware device to achieve higher throughput than if it completed the 8 IO jobs. One solution to eliminate resource starvation would be to limit the IO jobs that the driver can select buy sending IO jobs to the hardware one at a time. This technique implemented naively would severely impact throughput. That is, by hand picking each IO job the hardware device would not be able to reach its throughput potential. Thus, techniques for balancing throughput vs. resource starvation are desirable.

SUMMARY

An example embodiment of the present disclosure describes a method. In this example, the method includes, but is not limited to estimating time cost values for a plurality of IO jobs from a completion sequence, the time cost equal to an estimated amount of time a hardware device will take to process a given IO job; determining a target latency value for the hardware device; determining an in-flight time cost value, the in-flight time cost value indicative of the time cost for IO jobs that are being processed by the hardware device; and sending an amount of IO jobs to the hardware device, the amount having a combined time cost value operable to increase the in-flight time cost to at least the target latency value. In addition to the foregoing, other aspects are described in the claims, drawings, and text forming a part of the present disclosure.

An example embodiment of the present disclosure describes a method. In this example, the method includes, but is not limited to storing a completion sequence, the completion sequence associated with completion signals for a plurality of IO jobs; determining an estimated time cost for the IO jobs in the completion sequence, the time cost equal to an amount of time the hardware device was estimated to require in order to process the IO jobs in the completion sequence, the time cost calculated from characteristics of the IO jobs in the completion sequence modified by cost factors for the characteristics of the IO jobs; adjusting the cost factors for the characteristics of the IO jobs based on a comparison between the estimated time cost and a duration of the completion sequence; receiving a subsequent IO job; and determining the estimated time cost for the subsequent IO job based on characteristics of the IO job and the adjusted cost factors for the characteristics of the IO job. In addition to the foregoing, other aspects are described in the claims, drawings, and text forming a part of the present disclosure.

An example embodiment of the present disclosure describes a method. In this example, the method includes, but is not limited to receiving completion signals from a hardware device over a period of time; determining that a minimum amount of IO jobs that are concurrently in-flight to the hardware device during the period of time is greater than a qualification threshold; generating a completion sequence from the completion signals received over the period of time; adjusting cost factors associated with characteristics of the IO jobs in the completion sequence; receiving a subsequent IO job; and determining an estimated time cost for the subsequent IO job based on characteristics of the subsequent IO job and the adjusted cost factors. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
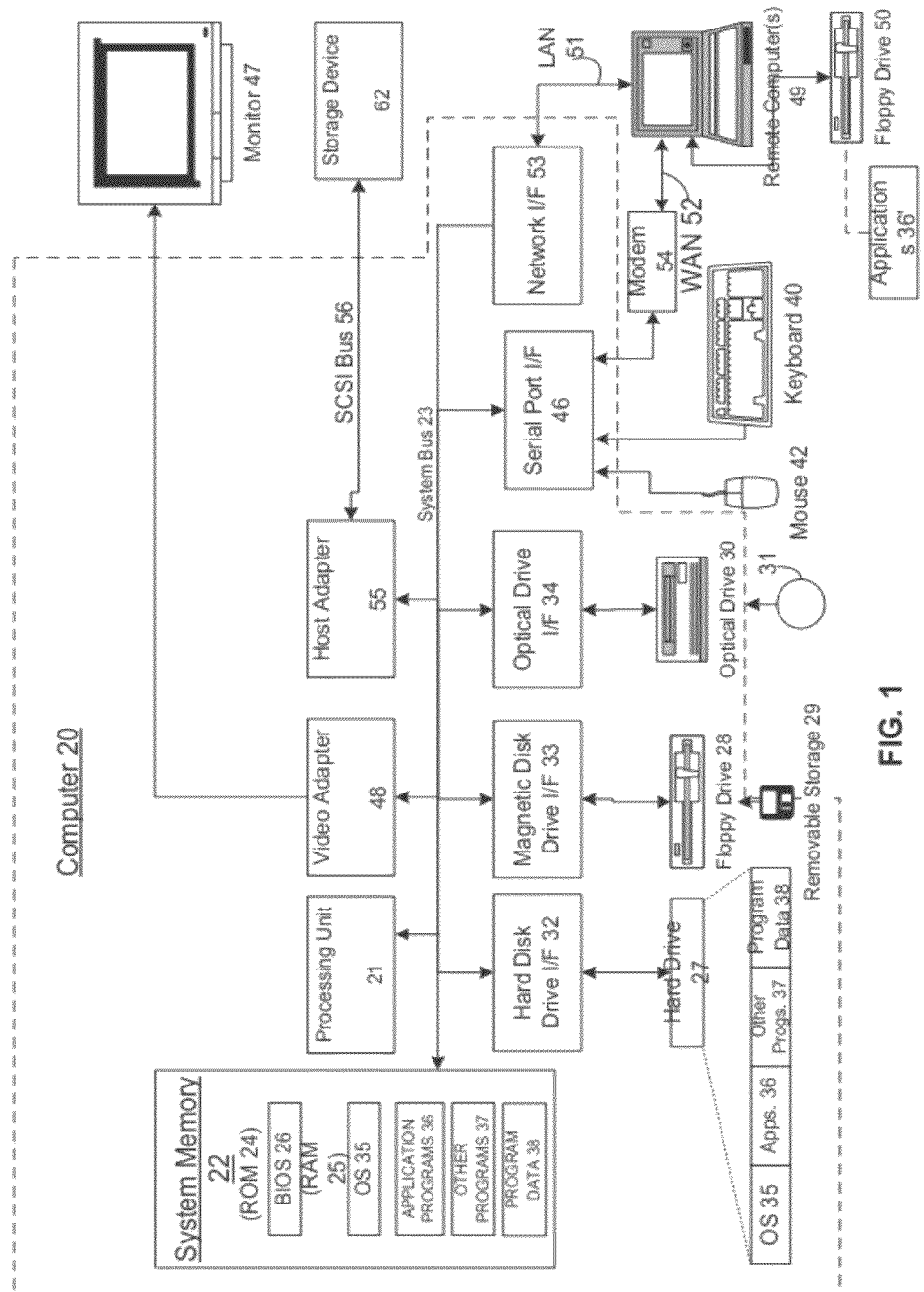
FIG. 1 depicts an example computer system wherein aspects of the present disclosure can be implemented.

Embodiments of the present disclosure may execute on one or more computers. FIG. 1 and the following discussion is intended to provide a brief general description of a suitable computing environment in which the disclosure may be implemented. One skilled in the art can appreciate that some or all of the components of the computer system of FIG. 1 can be used to effectuate computer 200 of FIG. 2 and the computer 200 of FIG. 3.

The term circuitry used through the disclosure can include specialized hardware components such as hardware interrupt controllers, hard drives, network adaptors, graphics processors, and audio codecs for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21 that can include one or more logical processors, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
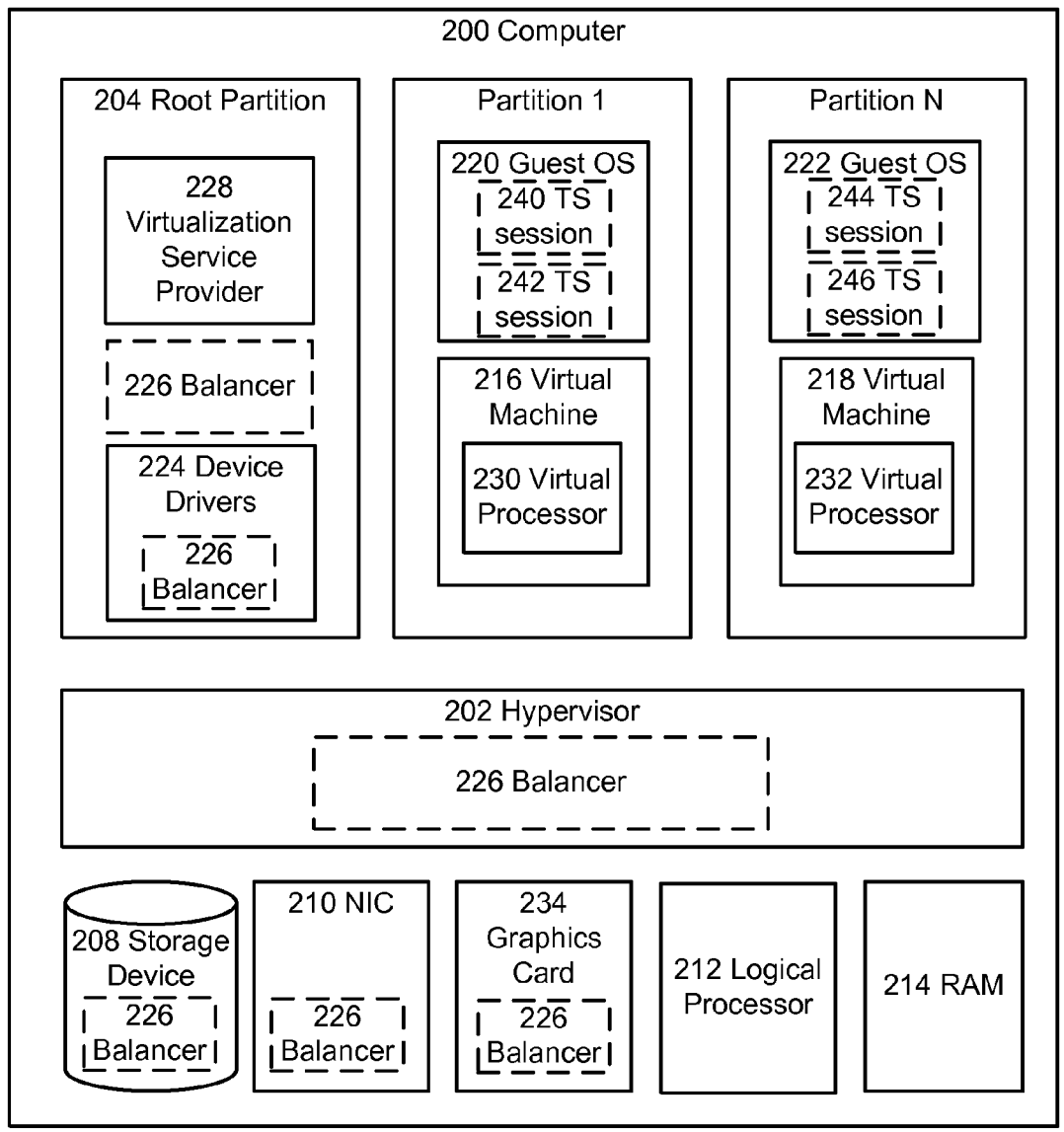
FIG. 2 depicts an operational environment for practicing aspects of the present disclosure.
Figure 3:
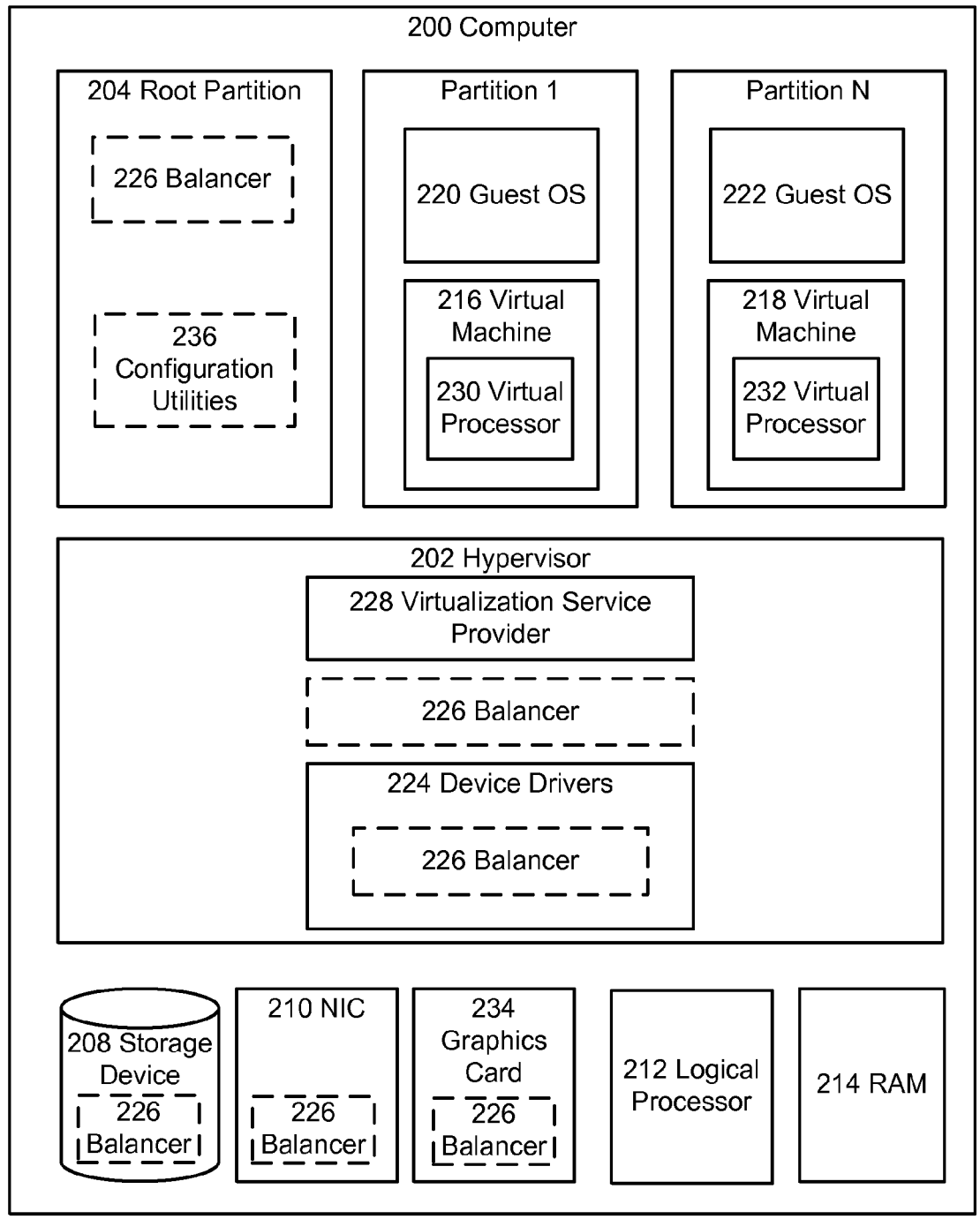
FIG. 3 depicts an operational environment for practicing aspects of the present disclosure.

Referring now to FIGS. 2 and 3, they depict high level overviews of computer systems including circuitry for virtualizing resources that can be used in aspects of the present disclosure. As shown by the figure, computer 200 can include physical hardware devices such as storage device 208, e.g., a hard drive, a network interface controller (NIC) 210, e.g., a network interface card or Ethernet adapter, a graphics card 234, at least one logical processor 212 and random access memory (RAM) 214. One skilled in the art can appreciate that while one logical processor is illustrated in other embodiments computer 200 may have multiple logical processors, e.g., multiple execution cores and/or multiple processors. In these embodiments multiple threads can be executed at the same time, e.g., one or more threads per logical processor. Continuing with the description of FIG. 2, depicted is a hypervisor 202 that may also be referred to as a virtual machine monitor. The hypervisor 202 in the depicted embodiment includes executable instructions for controlling and arbitrating access to the hardware of computer 200. The hypervisor 202 can generate execution environments called partitions such as partition 1 and partition N (where N is an integer greater than 1.) In embodiments of the present disclosure a partition can be considered the basic unit of isolation supported by the hypervisor 202, that is, each partition can be mapped to a set of hardware resources, e.g., memory, devices, logical processor cycles, etc., that is under control of the hypervisor 202. In an embodiment the hypervisor 202 can be a stand alone software produce, a part of an operating system, embedded within firmware of the motherboard or a portion of the hypervisor 202 can be effectuated by specialized integrated circuits.

Continuing with the description of FIG. 2, the computer 200 can include a root partition 204 that may include a virtualization service provider 228 (VSP.) In this example architecture the root partition 204 can access the underlying hardware via device drivers 224. The VSP 228 in this example can effectuate interfaces in partitions know as children, and these children can be considered virtual machines. The virtualization service provider 228 effectuates virtual machines 216 and 218 by instantiating different classes of devices as software and exposes interfaces to the devices within the partitions. Each virtual machine can include a virtual processor such as virtual processors 230 and 232 that guest operating systems 220 and 222 can manage and schedule threads to execute thereon. Generally, the virtual processors 230 and 232 are executable instructions and associated state information that provides a representation of a physical processor with a specific architecture. For example, one virtual machine may have a virtual processor having characteristics of an Intel 80X86 processor, whereas another virtual processor may have the characteristics of a Power PC processor. The virtual processors in this example can be mapped to logical cores of the computer system such that the instructions that effectuate the virtual processors will be backed by logical processors. Thus, in these example embodiments multiple virtual processors can be simultaneously executing while, for example, another logical processor is executing hypervisor instructions.

Continuing with the description of FIG. 2, it additionally illustrates a balancer 226. The balancer 226 can include computer executable instructions that can balance hardware usage among a plurality of clients using a variety of techniques to reduce resource starvation experienced by a client and maximize throughput. As is illustrated by the dashed lines of FIG. 2, the balancer 226 can be loaded within the computer executable code that effectuates the hypervisor 202 or in other embodiments the balancer 226 can be part of the code that effectuates the root partition 204. The balancer 226 can in other embodiments be a stand alone piece of code that is not part of another piece of code, e.g., the balancer 226 does not have to be part of the hypervisor 202 or the root partition 204 and the disclosure is not limited to the depicted embodiments. The balancer 226 can additionally be part of a driver for a hardware device. In this example driver developers can augment the existing algorithms used to maximize throughput with techniques described herein. As shown by the figure, the balancer 226 can additionally be embedded within the physical hardware devices in the form of specialized circuits or firmware.

Referring now to FIG. 3, it illustrates an alternative architecture that can be used to practice embodiments of the present disclosure. FIG. 3 depicts similar components to those of FIG. 2, however in this example embodiment the hypervisor 202 can include the virtualization service provider 228 and device drivers 224, and the root 204 can contain configuration utilities 236. In this architecture the hypervisor 202 can perform the same or similar functions as the hypervisor 202 of FIG. 2. The hypervisor 202 of FIG. 3 can be a stand alone software produce, a part of an operating system, embedded within firmware of the motherboard or a portion of the hypervisor 202 can be effectuated by specialized integrated circuits. In this implementation the hypervisor 202 can be thought of as instructions that execute directly on the bare metal of the hardware. In this example the root partition 204 may have instructions that can be used to configure the hypervisor 204 however hardware access requests may be handled by the hypervisor 202 instead of being passed to the root partition 204. Similar to that above, the balancer 226 can be included within the instructions that effectuate the hypervisor 202, the instructions that effectuate the root partition 204, any other place within the computer system 200, or by hardware.

In embodiments of the present disclosure the balancer 226 is operable to manage the flow of IO jobs from a client to a hardware device such that resource starvation is reduced and high throughput is obtained. Generally, and throughout the disclosure concepts will be described using units of time instead of byte count or IO job count for ease of explanation and the disclosure is not limited to implementations where calculations are based in and on time. That is, in other example implementations the disclosed algorithms can be modified to be based on IO job count or byte count since there are relationships between IO jobs, bytes in IO jobs, and time that will be described in more detail below and in the related applications.

The balancer 226 can calculate the throughput of the hardware device in order to attempt to maximize the hardware device's throughput. Hardware devices do not generally provide any meaningful information about throughput, thus alternative techniques need to be used. In example embodiments the throughput of the hardware device can be obtained using the amount of time required to complete IO jobs pending in the hardware device (the time cost of pending IO jobs.) For example, time cost represents an estimated amount of time that the hardware device will require in order to complete an IO job. Or put another way, time cost represents the amount of 'dedicated' time that the hardware device will take to execute a given IO job and return a completion signal to the balancer 226. If a hardware device can only execute one IO job at a time, then the IO time cost of an IO job is just the time duration from when the IO job is issued to the hardware until the hardware completes the IO job. In this example the entire time duration is dedicated to the one IO job because the hardware can't make progress on more than one IO job at a time. In another example a storage device may have 6 separate drives and can execute 16 IO jobs at a time. In this example the duration of time from when the IO job is issued until it completes is not equivalent to its IO time cost. In this example the IO time cost may be as low as $1/16^{th}$ of the duration.

Each time cost for an IO job can be estimated by the balancer 226 using quantifiable characteristics of the IO jobs and previously obtained characteristics of a completion sequence. For example, a completion sequence can be thought of as the a series of IO job completion signals received within a set period of time. Generally, the smaller the completion sequence's time duration, the better an estimate can be made about the characteristics of a given incoming IO job, e.g., fewer IO jobs per sequence allows the balancer 226 to make a better estimate of the costs of individual characteristics. Ideally the completion sequence would be a single IO job, however in certain implementations the CPU cost needed to analyze a single completion signal outweighs the benefits of obtaining such an accurate estimate. For example, expensive timers may need to be used in order to obtain such a short duration. However it is envisioned that as processors become more powerful, and timers become less expensive to call, the period of time used as a completion sequence will shrink and the benefit of obtaining such an accurate estimate will outweigh the cost. Thus, the disclosure is not limited to any particular completion sequence duration.

When the completion sequence is obtained it can be used to refine cost factors that are assigned to the characteristics of the IO jobs and these cost factors can be revised over time. Incoming IO jobs can have their time cost estimated based on the characteristics of the IO job and the cost factors. These time cost estimates can be stored in memory while the IO jobs can either be stored in a queue, or sent to the hardware device.

From the estimates the throughput of the hardware device can be estimated by using techniques described herein and in U.S. patent application Ser. No. 12/242,615 entitled "TEMPORAL BATCHING OF I/O JOBS." Generally, as the time cost of the concurrently pending IO jobs increases so does achieved throughput. This is because hardware devices such as storage devices complete IO jobs in accordance with internal algorithms (performed either in hardware, firmware, or in the driver) that attempt to select IO jobs to execute so that the most amount of jobs can be completed within the shortest period of time. This is most efficiently accomplished when the hardware device has a plethora of IO jobs to select from. As time cost of pending IO jobs increases so does throughput up to a point where the hardware device is saturated, or a point where the addition time cost of an additional IO job provides no significant additional hardware throughput. In an embodiment the saturation point can be used as a target latency value, or a time cost of pending IO jobs that the balancer 226 wants to keep the hardware device above in order to achieve high throughput.

In order to achieve high throughput the balancer 226 can keep the hardware saturated with IO jobs and in order to reduce starvation and the balancer 226 can use the time cost estimated in conjunction with techniques described in U.S. application Ser. No. 12/242,624 entitled "BALANCING USAGE OF HARDWARE DEVICES AMONG CLIENTS" to select which IO jobs to send to the hardware device. For example, IO jobs can be sent to the hardware device based on the amount of time a client used the hardware device. As the balancer 226 sends more IO jobs associated with one client the client's allocated amount of time can be depleted or used up. When a client uses up their allotted time client IO jobs can be stored in a queue and other IO jobs from other clients can be sent to the hardware device. In this implementation, throughput is high, and resource starvation experienced by clients is relatively low compared to the situation where one client is dominating the hardware device.

In one example implementation 'flows' are used by the balancer 226 to keep track of which client has overused the hardware device and which client can use the hardware device. For example, a flow can represent the IO jobs being issued from a specific client to a specific hardware device. Thus, if there are two hardware devices a client could have two flows, e.g., one for each hardware device. In an implementation each flow can be a value that represents the total amount of time the client can use or has overused the hardware device. Conceptually speaking a positive value can represent time a client can use whereas a negative value can represent how much the client overused a hardware device. While the terms 'positive' and 'negative' are used throughout the disclosure one skilled in the art can appreciate that this is to provide a simple way to illustrate concepts and that the terms 'positive' and 'negative' are not limited to their literal meaning. That is, in an embodiment a 'negative' value could be any information that can be interpreted by a computer as meaning that a client has overused the hardware whereas a positive number can be any information that can be interpreted by a computer as meaning the client has time available on the hardware device. One of skill in the art can appreciate that in embodiments where the balancer 226 is configured to provide short term balance the flows may not go negative. That is, a client may not overuse a hardware device. In certain embodiments however the cost of switching flows may be higher than the cost of allowing the client to overuse the hardware device, thus in these and other embodiments the balancer 226 may be configured to allow a client to overuse the hardware device in order to keep throughput high by using techniques described in U.S. patent application Ser. No. 12/242,615 entitled "TEMPORAL BATCHING OF I/O JOBS."

The following are a series of flowcharts depicting implementations of processes. For ease of understanding, the flowcharts are organized such that the initial flowcharts present implementations via an overall "big picture" viewpoint and subsequent flowcharts provide further additions and/or details. Those having skill in the art will appreciate that the style of presentation utilized herein generally allows for a rapid and easy understanding of the various operational procedures that form a part of the present disclosure.

Figure 4:
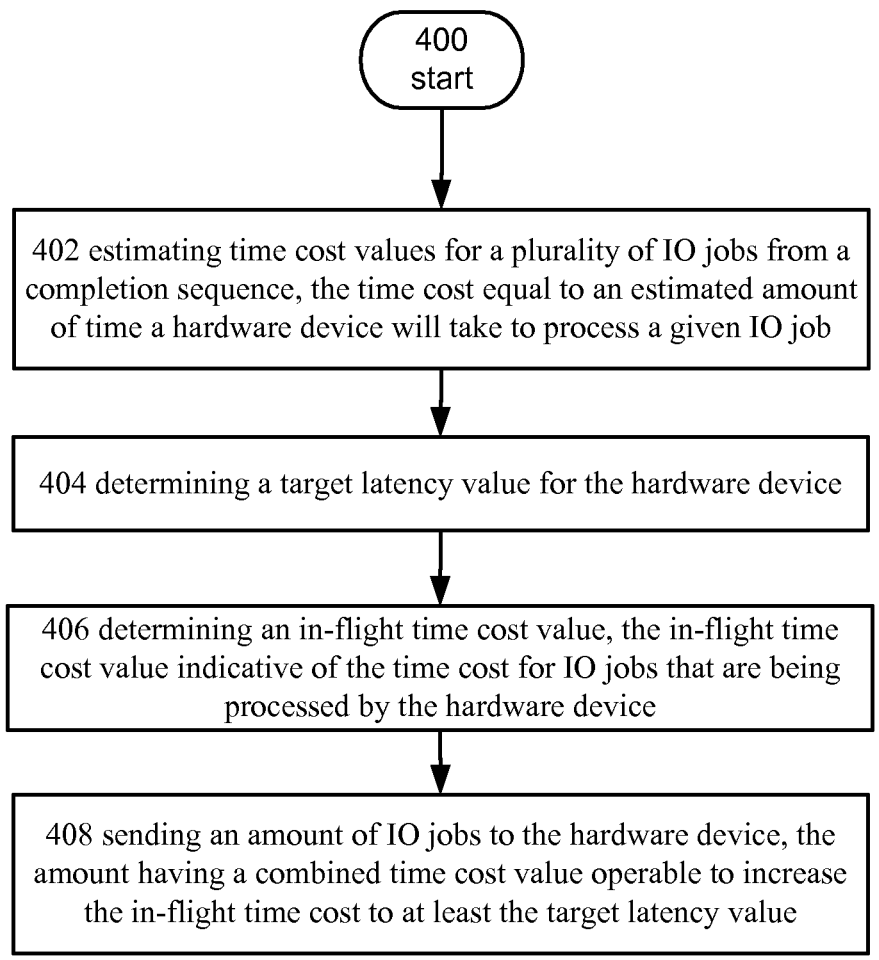
FIG. 4 depicts an operational procedure for maximizing hardware throughput.

Referring now to FIG. 4 it depicts an operational procedure for maximizing hardware throughput including operations 400, 402, 404, 406, and 408. Operation 400 begins the operational procedure and operation 402 shows estimating time cost values for a plurality of IO jobs from a completion sequence, the time cost equal to an estimated amount of time a hardware device will take to process a given IO job. For example, and referring to FIG. 2 and/or FIG. 3, the balancer 226 can receive an IO job from a client such as, for example, virtual machine 216. In an embodiment the processor 212 can execute instructions indicative of the root partition 204 and the balancer 226. The balancer 226 can have a memory location that is shared with the virtual machine 216, e.g., a ring buffer or a self overwriting memory location. The IO jobs in this example can be jobs for a storage device 208, e.g., a read, write, a flush, etc., a job for a NIC 210, e.g., a request to send one or more packets of information, or a draw command for a graphics card. In this example the balancer 226 can access the shared memory location and receive information that identifies the request and, for example, a pointer to the data. In an embodiment where the balancer 226 is embedded within the hardware device the IO jobs could be received from the device driver 224. In this example, information that identifies which client the request is associated with can be sent to the hardware device. In yet another implementation the balancer 226 can be effectuated by instructions that are a part of the hypervisor 202. In this example the client can place the request in the shared memory location; the hypervisor 202 can be executed; and the IO jobs can be passed to the balancer 226.

The balancer 226 can in this example generate an estimate of how much time it will take for the hardware device to process the request based on, for example, the type of request, the number of bytes in the request, and a previously obtained completion sequence. The completion sequences can be used to determine how much time cost should be assigned to each characteristic and each time cost per characteristic can be added to obtain the total time cost for the IO job. In example embodiments each characteristic can be multiplied by a cost factor that represents how 'expensive' the characteristic is. For example, if a characteristic is total bytes per IO job and the cost factor could be 78 μs for 4 kb of data then the time cost for total bytes can be calculated by multiplying the cost factor by the total bytes of the incoming IO job. Over time the cost factors can be refined based on new completion sequences so that future estimates of incoming IO jobs can be adjusted based on how the hardware is completing IO jobs. Generally speaking, the shorter the time duration used to obtain a completion sequence the better because if, for example, the completion sequences were an hour long it would be difficult for the balancer 226 to derive any useful information from different sequences, that is, since completion sequences look the same over such a large time period. However in order to obtain completion sequences that are very short, e.g., less than 10 ms, a considerable amount of processing power would need to be used since at that time interval it is difficult to separate the noise from the sequences so the determination of the exact time period is a balance between exactness and processing time and is left up to an implementer.

Continuing with the description of FIG. 4, operation 404 shows determining a target latency value for the hardware device. For example, and continuing with the description of FIG. 4, the balancer 226 can be executed by a processor 212 and the processor 212 can determine a target latency value for the hardware device. In an embodiment the target latency value can be based on multiple targets depending on the characteristics of the IO jobs that are pending in the hardware device, e.g., 'in-flight' to the hardware device. That is, it can be adjusted based on the total characteristics of the pending IO jobs. In another embodiment the target latency value can be set as the saturation point for the hardware as is described in U.S. patent application Ser. No. 12/242,615 entitled "TEMPORAL BATCHING OF I/O JOBS." The saturation point can represent a time cost of the amount of work in flight to the hardware device where the addition of more IO jobs will not significantly increase hardware throughput. In specific implementations the target latency value can be stored in a memory location, e.g., ROM of the hardware device, RAM of a computer system 200, etc., and can be retrieved by the balancer 226.

Continuing with the description of FIG. 4, operation 406 shows determining an in-flight time cost value, the in-flight time cost value indicative of the time cost for IO jobs that are being processed by the hardware device. For example, in an embodiment of the present disclosure the balancer 226 can estimate the amount of work the hardware device currently has from information that identifies what IO jobs have been sent to the hardware device and a completion signal has not yet been received. For example, when IO jobs are received by the balancer 226 the estimated amount of time the hardware device will need to process the IO jobs can be determined and stored. The IO jobs can be sent to the hardware device using techniques described U.S. patent application Ser. No. 12/242, 615 entitled "TEMPORAL BATCHING OF I/O JOBS" and/ or U.S. application Ser. No. 12/242,624 entitled "BALANCING USAGE OF HARDWARE DEVICES AMONG CLIENTS," and the balancer 226 can determine an estimated amount of total work the hardware device has in it's buffer. In a specific example 10 IO jobs may have been sent to the hardware device with an associated completion time equal to 83 ms. A completion signal may be received by the balancer 226 and a processor 212 can execute the balancer instructions and determine that the IO job associated with the completion sequence was estimated to take 9 ms to complete and the in-flight time cost value of 83 ms can be reduced by 9 ms.

As is shown by FIG. 4, operation 408 depicts sending an amount of IO jobs to the hardware device, the amount having a combined time cost value operable to increase the in-flight time cost to at least the target latency value. For example, in an addition to the previous example the balancer 226 can send an amount of IO jobs to the hardware device that have a combined time cost operable to raise the in-flight time cost to at least the target latency value. In an embodiment of the present disclosure IO jobs can be sent to the hardware device having an estimated amount of time equal to or greater than the amount needed to reach the target latency. In this way the balancer 226 can keep the hardware device at the target latency value. In a specific example, and continuing from the example described in operation 406, the target latency could be 83 ms and the balancer 226 could have determined that the estimated in-flight amount of time on the hardware device has dropped from 83 ms to 74 ms. In this example the balancer 226 can determine that 9 ms of IO jobs need to be sent to the hardware device to keep at or above the target latency and one or more IO jobs can be sent to the hardware device. For example, in an embodiment the balancer 226 can send more than 9 ms worth of IO jobs to the hardware device such as an amount equal to the target latency times 1.2 such as a batch of IO jobs as is described in U.S. patent application Ser. No. 12/242,615 entitled "TEMPORAL BATCHING OF I/O JOBS." The batch in this example can be selected in accordance with techniques described in U.S. application Ser. No. 12/242,624 entitled "BALANCING USAGE OF HARDWARE DEVICES AMONG CLIENTS." A specific example may include the balancer 226 being executed by the processor 212 and the processor can determine that 9 ms of IO jobs need to be sent to the hardware device. The balancer 226 can determine to send a batch of IO jobs that have a total in-flight time of 26 ms to the hardware device and 26 ms worth of IO jobs can be selected from a balancer queue that has had its negative value advanced to a positive value.

Figure 5:
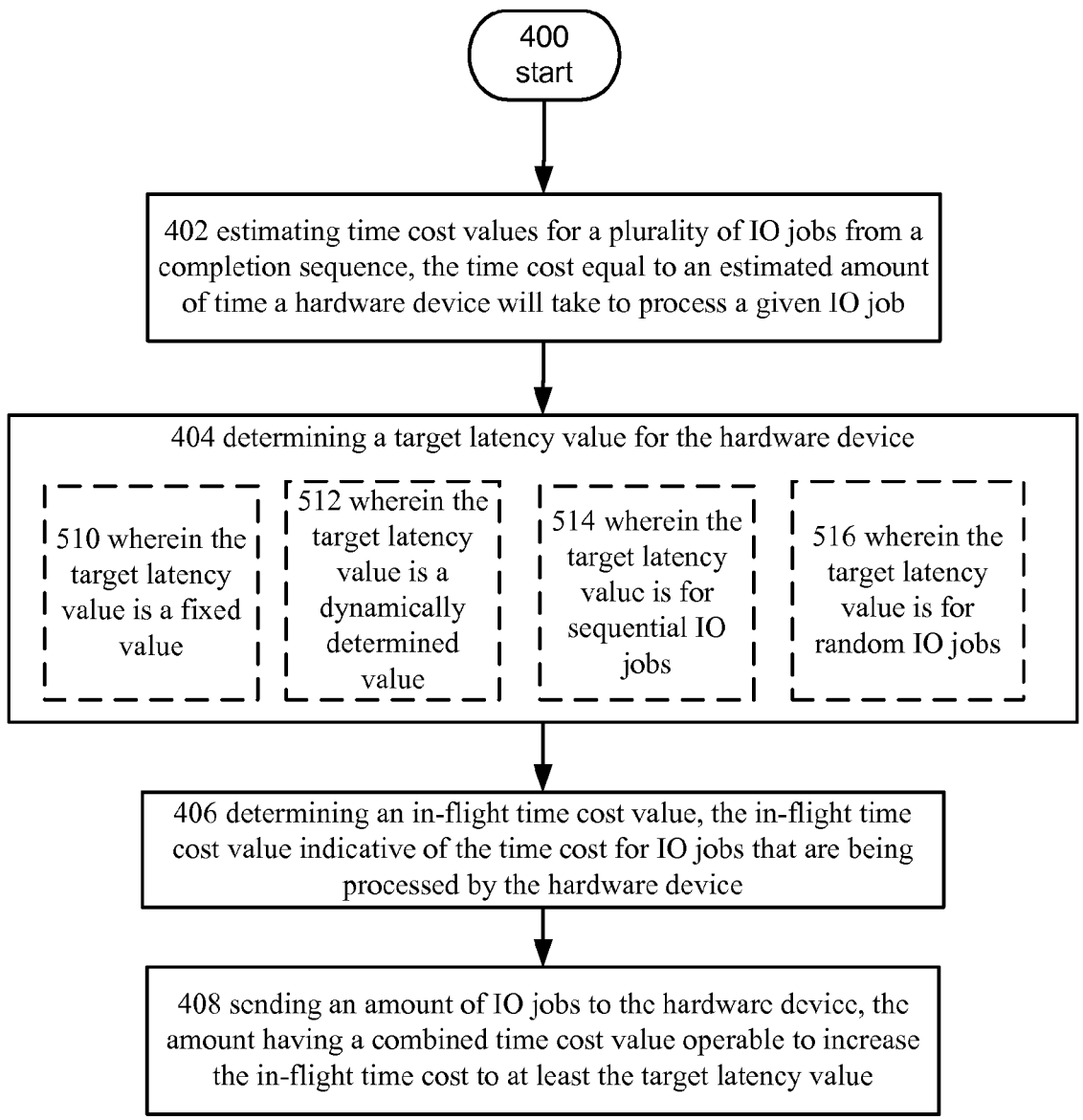
FIG. 5 illustrates an alternative embodiment of the operational procedure 400 of FIG. 4.

Referring now to FIG. 5, it illustrates an alternative embodiment of the operational procedure 400 of FIG. 4 including the additional operations 510, 512, 514, and 516. Referring to operation 510, it depicts the operational procedure of FIG. 4, wherein the target latency value is a fixed value. For example, in an embodiment of the present disclosure the balancer 226 can be configured to use a fixed target latency value. For example, in an embodiment a developer of the hardware device can perform experiments and determine a time value that is associated with an amount of IO jobs that saturate the hardware devices and store the value in ROM. In an example where the balancer 226 is a component of the hardware device, this value can be determined by the balancer 226 when the hardware device is powered on, or when the balancer 226 needs the value. In another embodiment, one in which the balancer 226 is software instructions executed by a processor 212, a target latency value appropriate for most commonly used hardware devices such as, for example, 83 ms for storage devices can be set via a user interface. In this example when the processor 212 executes the instructions indicative of the balancer 226 the saturation point can be determined by checking a memory location that stores the value during runtime.

In addition to operation 510, FIG. 5 additionally shows operation 512 that illustrates the operational procedure of FIG. 4, wherein the target latency value is a dynamically determined value. For example, in an implementation the balancer 226 can be effectuated by software instructions and executed by a processor 212 in order dynamically adjust the target latency value based on, for example, the throughput of the hardware device. For example, in instances where the hardware device is switched or another hardware device is added, the target latency value may change. In this example, the target latency value can be adjusted by increasing the target latency value periodically and determining whether throughput significantly increases based on the addition of, for example, 1 more ms of total completion time pending in the hardware device. If for example increasing the target latency value by a factor of 1.1 increases throughput buy a factor of 1.8 the balancer 226 can determine that the saturation point has not been reached. In this instance the balancer 226 can further multiply the target latency value by 1.1 the next time the balancer 226 is executed. If for example, increasing the target latency value by a factor of 1.1 increases throughput by a factor of 1.01 then the processor 212 can determine that the hardware device is saturated and the processor 212 can use the updated target latency value the next time the balancer 226 instructions are executed. One skilled in the art can appreciate that the ratios presented herein are exemplary and embodiments of the present disclosure are not limited to using any particular ratio of throughput to decreased average completion time.

Continuing with the description of FIG. 5, operation 514 shows the operational procedure of FIG. 4, wherein the target latency value is for sequential IO jobs. For example, in an embodiment of the present disclosure multiple target latency values can be stored and the balancer 226 can determine which latency value to use based on the characteristics of the in-flight IO jobs. For example, in an embodiment where the hardware device is storage device 208 the balancer 226 can have a target latency value for sequential IO jobs that is lower than, for example the general target latency value. Generally, sequential IO jobs require less time to process since the head of a hard drive does not have move as far in order to write data to the storage medium. Thus in embodiments of the present disclosure the balancer 226 can determine a target latency for sequential jobs and use the value when the in-flight IO jobs are sequential or when a significant amount of the in-flight IO jobs are sequential such as over 80% of pending IO jobs.

Continuing with the description of FIG. 5, operation 516 shows the operational procedure of FIG. 4, wherein the target latency value is for random IO jobs. In an embodiment of the present disclosure the balancer 226 can be configured to use a target latency value for random IO jobs, or put another way, non-sequential IO jobs. In this example the head of the storage device 208 would have to move to random portions of the platter in order to write data to the correct logical block. In this example the target latency value for random IO jobs may be determined to be higher than, for example, the general target latency and the target latency for sequential IO jobs. In embodiments of the present disclosure the balancer 226 can determine a target latency for random IO jobs and use the value when the in-flight IO jobs are random or when a significant amount of the in-flight IO jobs are random such as over 80% of pending IO jobs. In one instance the balancer 226 can use both the target latency values for sequential and random IO jobs and derive a target latency value that takes into account a mixture of the IO jobs that are in flight to the hardware device. For example, if the in-flight IO jobs are 30% sequential and 70% random, the balancer 226 can multiply the sequential target latency value by 0.3; the random value by 0.7 and add them together to use as a mixed target latency value.

Figure 6:
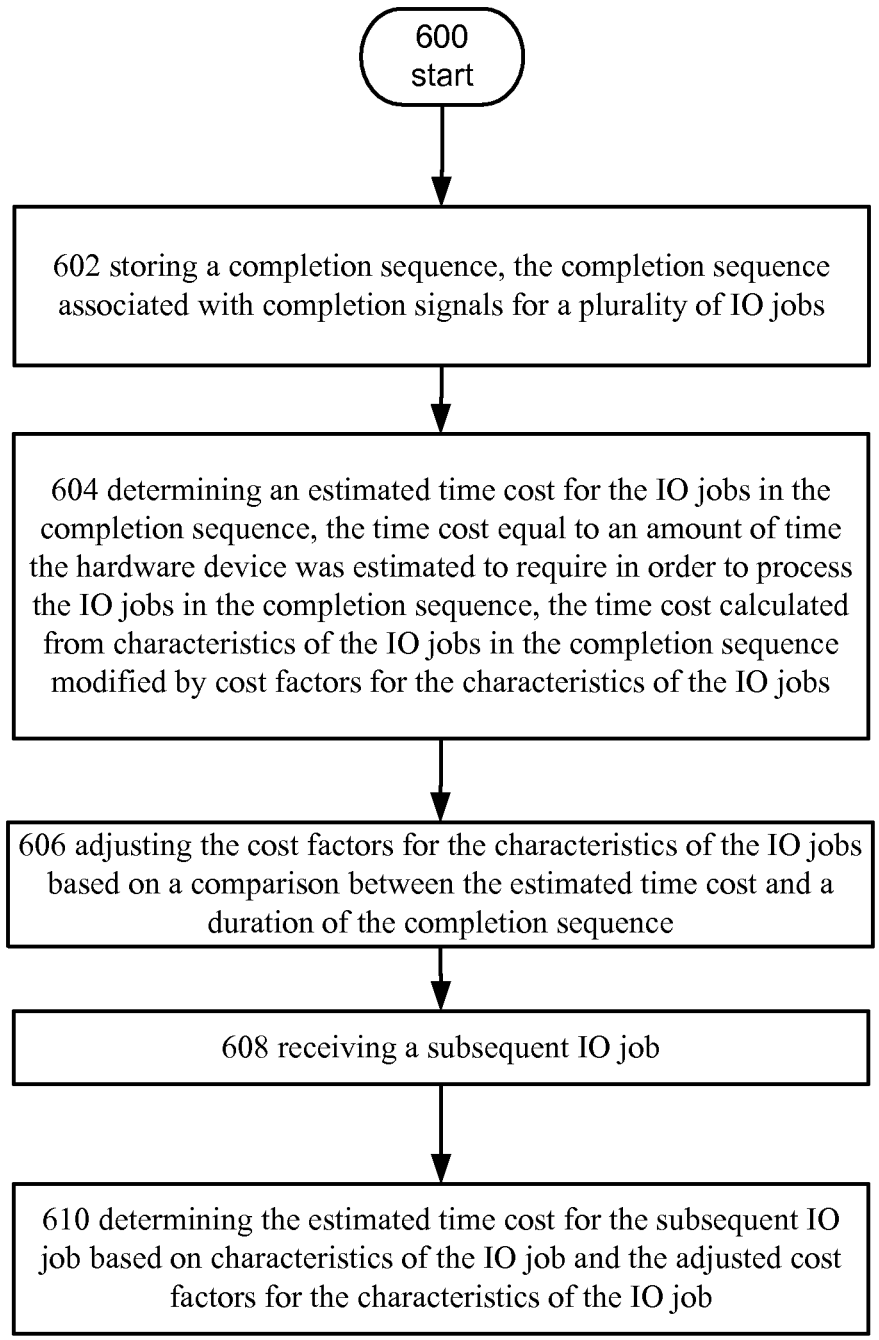
FIG. 6 depicts an operational procedure for assigning a time cost value to an IO job.

Referring now to FIG. 6, it depicts an operational procedure for assigning a time cost value to an IO job including operations 600 through 610. As is shown by the figure, operation 600 beings the operational procedure and operation 602 illustrates storing a completion sequence, the completion sequence associated with completion signals for a plurality of IO jobs. For example, in embodiments of the present disclosure the balancer 226 can store a completion sequence, e.g., the entire sequence or a summary of the sequence (total value for each source of cost, and total duration of the sequence), in memory such as RAM. In embodiments of the present disclosure a completion sequence can comprise completion signals that are received from the hardware device during a fixed time period such as 30 ms. For example, hardware generally generates and sends IO job completion signals as soon as the hardware completes the work represented by the IO job, e.g., disk read/write, network send, etc. The completion sequences can be used to determine characteristics of the IO jobs so that future estimates of incoming IO jobs can be refined based on how the hardware is completing IO jobs.

Continuing with the description of FIG. 6, operation 604 shows determining an estimated time cost for the IO jobs in the completion sequence, the time cost equal to an amount of time the hardware device was estimated to require in order to process the IO jobs in the completion sequence, the time cost calculated from characteristics of the IO jobs in the completion sequence modified by cost factors for the characteristics of the IO jobs. For example, and continuing with the example above, the balancer 226 can determine an estimated amount of time that the IO jobs in the completion sequence were expected to take. As was described above, in an embodiment when an IO job is received by the balancer 226 an estimate can be made for the IO job based on the characteristics of the IO job and current cost factors for the characteristics. Once the estimate is calculated it can be stored in memory and the IO job can be sent to the hardware device. The cost factors in this example can be weighted values that represent amount of time the characteristic is estimated to incur. Such cost factors can be associated with the total number of bytes transferred by the IO jobs, e.g., read/write, network send, etc., whether there was a seek (in a storage device example), the data link value (in a network card example), how many IO jobs are in the sequence, etc.

In an example the IO job's completion signal may be returned in a completion sequence along with other IO job's completion signals. The balancer 226 in this example can calculate the total estimated amount of time cost for the IO jobs in the completion sequence based on the stored estimates of the cost factors and compare the total to the actual time cost for the IO jobs to determine whether the estimates of the cost factors were wrong. The difference between the actual time cost and the estimated time cost can be used to adjust the estimated cost factors.

Continuing with the description of FIG. 6, operation 606 adjusting the cost factors for the characteristics of the IO jobs based on a comparison between the estimated time cost and a duration of the completion sequence. For example, the estimated time cost can be compared to the actual time cost and the difference can be used as a correction signal. That is, the difference can then be used to adjust the cost factors that are associated with the IO job characteristics. In one embodiment a running numeric approximation of a least difference fit can be used to adjust the cost factors. The cost factors in an example implementation can be adjusted so that the estimate of the completion sequence moves an amount equal to a percentage closer to the actual cost in order to slowly move the estimate to the actual amount. For example, the relative influence a given cost factor may have on the estimate may be incorrectly determined from a given completion sequence and so by moving the estimate a percentage closer to the actual an incorrect estimate would not have a drastic affect on future estimates. This allows the balancer 226 to slowly converge on a more accurate estimate of an IO job's time cost. In this, and other embodiments the adjustments can be made over time to avoid having cost factor estimates drastically change from one completion sequence to the next. In one example implementation the averaging can be implemented by storing a copy of the 40 latest completion sequence outcomes, e.g., measured duration and totals for the sources of cost corresponding to the cost factors, and re-evaluate the last, for example, 40 completion sequence cost source totals and measured duration on a periodic basis.

Continuing with the description of FIG. 6, operation 608 depicts receiving a subsequent IO job. For example, and referring to FIG. 2 and/or FIG. 3, the balancer 226 can receive an IO job from a client such as, for example, virtual machine 216. In an embodiment the processor 212 can execute instructions indicative of the root partition 204 and the balancer 226. The balancer 226 can have a memory location that is shared with the virtual machine 216, e.g., a ring buffer or a self overwriting memory location. The IO job in this example can be a job for a storage device 208, e.g., a read, write, a flush, etc., a job for a NIC 210, e.g., a request to send one or more packets of information, or a draw command for a graphics card. In this example the balancer 226 can access the shared memory location and receive information that identifies the IO job and, for example, a pointer to the data. In an embodiment where the balancer 226 is embedded within the hardware device the IO request could be received from the device driver 224. In this example, information that identifies which client the request is associated with can be sent to the hardware device. In yet another implementation the balancer 226 can be effectuated by instructions that are a part of the hypervisor 202. In this example the client can place the request in the shared memory location and the hypervisor 202 can be executed and the job can be passed to the balancer 226.

Continuing with the description of FIG. 6, operation 610 depicts determining the estimated time cost for the subsequent IO job based on characteristics of the IO job and the adjusted cost factors for the characteristics of the IO job. For example, in this embodiment the balancer 226 can identify the characteristics of the IO job and determine an estimated time cost for the IO job based on the current, i.e., recent updated cost factors. For example, in an embodiment of the present disclosure the estimate may be too low, that is, the actual time it took for the hardware device to complete the IO jobs in the completion sequence was larger than the estimated amount of time, e.g., the sequence was estimated to take 20 ms and the IO jobs in the sequence were processed by the hardware device in 30 ms. In this example the balancer 226 may have adjusted one or more of the cost factors by an amount that would move the estimate closer by 2 ms and increased the cost factors by amounts that would make the estimated cost for the completion sequence closer to the actual cost for the completion sequence. Once the balancer 226 generates an estimate, the IO job can be stored in the balancer queue or sent to the hardware device and the estimate can be stored in memory.

Figure 7:
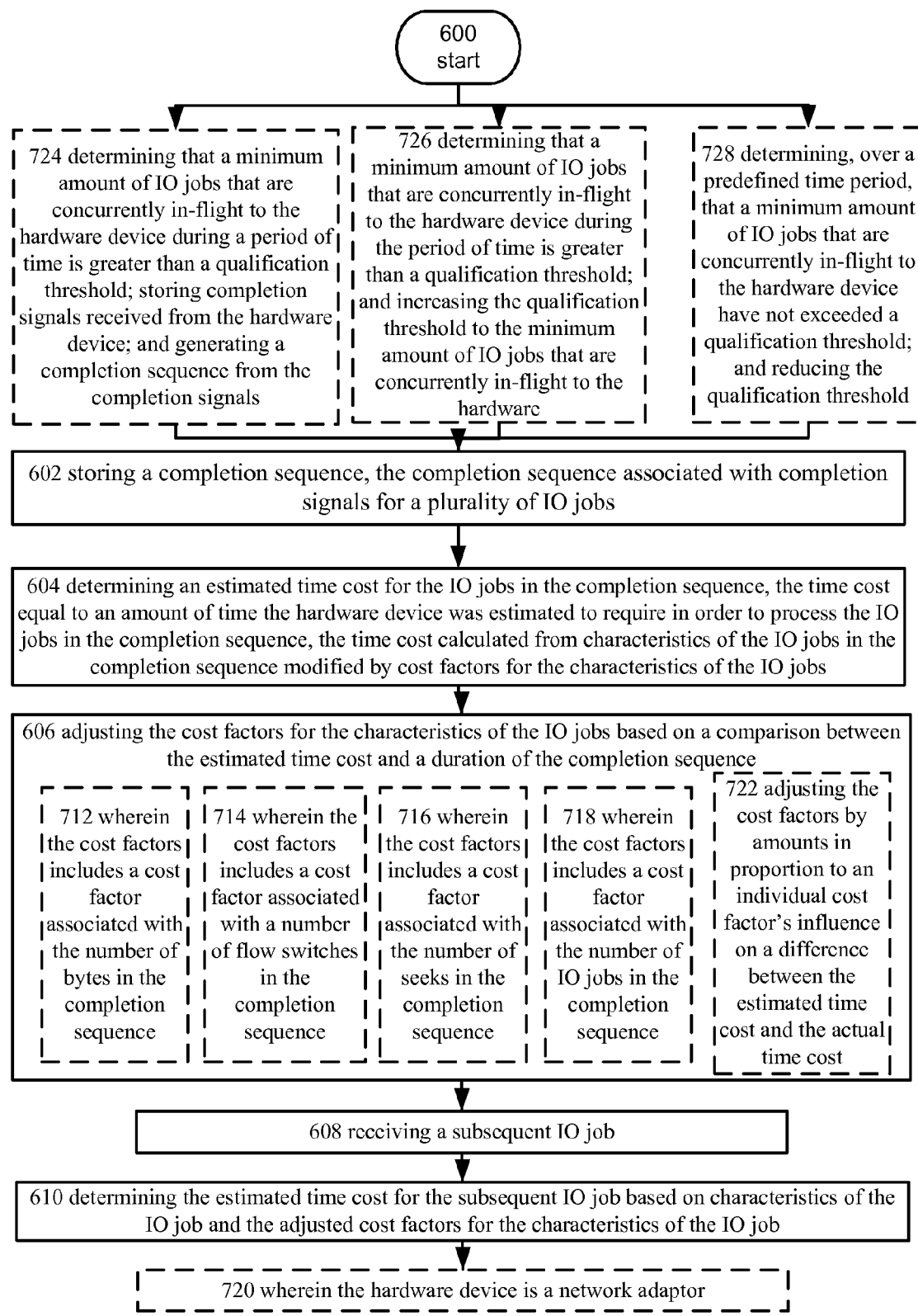
FIG. 7 illustrates an alternative embodiment of the operational procedure 600 of FIG. 6.

Referring now to FIG. 7, it illustrates an alternative embodiment of the operational procedure 600 of FIG. 6 including optional operations 712, 714, 716, 718, 720, 722, 724, 726, and 728. Referring now to operation 712, wherein the cost factors include a cost factor associated with the number of bytes in the completion sequence. For example, in an embodiment of the present disclosure a cost factor can be used to adjust the estimated time cost for an IO job based on the total number of bytes in the IO job. In an example embodiment the balancer 226 can be executed by processor 212 and a determination can be made as to how many bytes were transferred in the IO jobs that are in the completion sequence. In one example embodiment the number of transferred bytes may be 1000 kb of data. The cost factor in this example includes a value that indicates that the IO time cost per 4 kb transferred is estimated to be 78 microseconds. Based on that cost factor it was estimated that the IO jobs in the completion sequence cost 19.5 ms. This number can be added with any other estimates and stored in memory.

Continuing with the description of FIG. 7, operation 714 shows wherein the cost factors include a cost factor associated with a number of flow switches in the completion sequence. For example, a flow switch in embodiments of the present disclosure indicates that the hardware device switched from completing IO jobs associated with one client to IO jobs associated with another client. As stated above, from the perspective of the balancer 226 how and why the hardware device completes IO jobs may seem arbitrary. That is, because each hardware device includes different and perhaps proprietary algorithms for maximizing throughput it may be costly to devise a program that can exactly model how a hardware device works internally. The hardware device such as storage device 208 may switch from reading/writing IO jobs from a first client, such as virtual machine 216 to IO jobs from a second client such as virtual machine 218. In an example embodiment such a switch incurs overhead because the head of the hardware device will have to move to another sector that may be physically distant. In this example the balancer 226 may use a cost factor that is based on how much of the time cost for IO jobs is due to a flow switch. Generally, unlike the number of bytes a flow switch can not be directly assigned to an individual IO job because it is unclear which IO job will cause the hardware device to perform a flow switch, thus in this example the cost factor of the flow switch can be added evenly to each incoming IO job. The spreading out of the flow switching cost can be accomplished by keeping a cost per flow switch and an average number of flow switches per IO job. The balancer 226 can then apportion each incoming job a percentage of the flow switching cost.

Continuing with the description of FIG. 7, operation 716 shows wherein the cost factors include a cost factor associated with the number of seeks in the completion sequence. For example, a cost factor can be associated with the number of seeks in an embodiment where the hardware device is a storage device 208. Generally speaking, a head of a storage device writes bits to a platter in logical blocks. In one embodiment the IO job can include a logical block address and the balancer 226 can check the address in an IO job and compare the address to the previous IO job. If the addresses are outside a predetermined logical block distance the current IO job can be considered a seek relative to the previous IO job. That is, the read/write head of the storage device 208 will have to be physically moved to the correct logical block and the movement requires an amount of time known as a seek time. In this example an initial seek value can be set to, for example 4 ms, and as completion sequences are observed the seek value can be adjusted. When an IO job is received by the balancer 226 from a client the seek cost factor can be added to the estimated time cost for the IO job based on whether it is a seek relative to the previous IO job.

In an example embodiment a dynamic seek cost factor can be used based on the distance that the head will have to traverse. In one example embodiment the balancer 226 can be configured to determine whether the current IO job is a short, medium, or long seek compared to the previous IO job. The cost factor for each type of seek can be calculated based on the operational characteristics of the storage device.

Continuing with the description of FIG. 7, operation 718 shows wherein the cost factors include a cost factor associated with the number of IO jobs in the completion sequence. In an example embodiment that includes operation 716, a cost factor can be used to assign a cost to the overhead associated with an IO job. For example, each IO job takes an amount of time for the hardware device to process and this amount of time can be calculated from the completion sequences and assigned as overhead to each IO job. A given completion sequence can be analyzed and the number of IO jobs in the sequence can be calculated. From the number of IO jobs in the sequence, the estimated time cost for the completion sequence and the actual time cost of the completion sequence, the balancer 226 can whether the cost factor associated with IO job overhead is too low or too high. The balancer 226 can make an adjustment to the cost factor based on the information in the completion sequence and store the cost factor in memory. Subsequently an incoming IO job may be received and cost factor associated with IO jobs may be set to 1 ms (this value may be an initial value or an adjusted value for example.) The balancer 226 can be executed and the estimated time cost for the incoming IO job can be incremented by 1 ms based on the IO job overhead.

As shown by operation 720, depicts the operational procedure of FIG. 6, wherein the hardware device is a network adaptor. For example, in at least one example embodiment the hardware device can be a network adaptor. In this example embodiment an estimated time cost of an IO job can be calculated from the network link rate and the IO job size in bytes. In the network adaptor implementation the processing time used by processor 212 to loading up the network card can be a cost factor. For example, the total cost of an IO job if it is small comes from loading the network adaptor where if it is a large IO job the cost is dominated by the number of bytes.

Continuing with the description of FIG. 7, operation 722 shows adjusting the cost factors by amounts in proportion to an individual cost factor's influence on a difference between the estimated time cost and the actual time cost. For example, in an embodiment the balancer 226 can be executed and the cost factors can be adjusted so that the estimated total time for a completion sequence converges to the actual time for completing the IO jobs in the completion sequence. In this example embodiment the cost factors themselves can be adjusted based on a characteristic's determined influence on the difference between the estimated total time for the completion sequence and the actual time for completing the IO jobs in the completion sequence. In at least one embodiment the cost factors can be normalized so that the total of the relative magnitude factors is 1.0. In specific example a completion sequence may be obtained by the balancer 226 and the actual duration of the IO jobs in completion sequence may be measured to be 30 ms. The balancer 226 can identify the IO jobs in the sequence and retrieve the time cost estimates for each IO job from memory. In this example the balancer 226 can be configured to add the estimates up and determine that the time cost estimates for the IO jobs in the completion sequence was 15 ms. Thus, in this example the difference would be 15 ms and the balancer 226 can determine that the cost factors are off and an adjustment is needed. In order to modify the cost factors the balancer 226 can compare the observed completion sequence to a previously obtained completion sequence or an average completion sequence, e.g., a sequence including an average amount of IO jobs and bytes for example to obtain un-normalized cost factor adjustment values. In a specific example, an average completion sequence may have 50 IO jobs and a total byte transfer of 1 m and the actual completion sequence may have actually transferred 0.5 mb and had 150 IO jobs in the sequence. Thus, in this example un-normalized cost factor adjustment value may be 3.0 for IO jobs (since the sequence had 3 times as many IO jobs in it,) and the cost factor adjustment value for bytes may be 0.5 (since the sequence had half as much data transferred.)

In one implementation the cost factors associated with IO job overhead and number of bytes may be increased to make the estimate the same as the actual, that is, the cost factors could be added up to 3.5 and multiplied by an adjustment value to equal 15 ms. Then the adjustment value could be divided between the two factors. Alternatively, or additionally, the estimate can be moved slowly to the actual and only a percentage of 15 ms may be added to the estimate such as 10%. In this example however the cost factors can be adjusted based on their relative influence on the completion sequence. That is, since there was 3 times as normal IO jobs in the completion sequence that cost factor can be adjusted more since the difference between the actual time cost and the estimated time cost is probably due to the number of IO jobs. In this example the amount of time that is going to be added to the estimate to make it closer to the actual time cost can be determined, e.g., 10% of 15 ms equals 1.5 ms by the balancer 226. The cost factors in this example can be normalized, e.g., 3.0/3.5 and 0.5/3.5; and the cost factor for IO jobs can be adjusted an amount equal to 1.5 ms (the time adjustment) *3.0/3.5=1.3 and the cost factor for number of bytes can be adjusted 1.5 ms*0.5/3.5=0.2. In this example, subsequence IO jobs that are received can be multiplied by the new cost factors, e.g., 4.3 per IO job and 0.7 per byte.

Continuing with the description of FIG. 7, operation 724 shows determining that a minimum amount of IO jobs that are concurrently in-flight to the hardware device during a period of time is greater than a qualification threshold; storing completion signals received from the hardware device; and generating a completion sequence from the completion signals. For example, in an embodiment of the present disclosure a completion sequence can be generated from completion signals received over a time period, however in certain embodiments the balancer 226 may require that at least a minimum amount of IO jobs be in flight to the hardware in order for the completion sequence to 'qualify' for use. That is, a certain number of IO jobs are required to be in flight to the hardware before the completion signals can be used to generate a completion sequence. For example and as described above, hardware devices such as storage device 208 operate more efficiently when they have more IO jobs to choose from, thus in certain embodiments it is desirable to use completion sequences to estimate cost factors in situations where the hardware device is operating efficiently. The balancer 226 can be configured to calculate the amount of IO jobs in flight to hardware and can record completion signals when, for example, at least a minimum number of IO jobs are stored in the hardware device's buffer that will provide with a completion sequence where the hardware device is operating efficiently. In an example embodiment the absolute minimum can be at least one IO job in flight to the hardware while the completion sequence is being obtained by the hardware.

Continuing with the description of FIG. 7, operation 726 shows determining that a minimum amount of IO jobs that are concurrently in-flight to the hardware device during the period of time is greater than a qualification threshold; and increasing the qualification threshold to the minimum amount of IO jobs that are concurrently in-flight to the hardware. For example, in an embodiment the qualification threshold could be as low as 1 IO job in flight during the period of time where the completion sequence is obtained, however in this example embodiment the balancer 226 can be configured to increase the qualification threshold based an increased amount of IO jobs concurrently in flight. For example, a first 30 ms period is measured by the balancer 226 and the minimum amount of IO jobs in-flight during the 30 ms sequence is 1. The next 30 ms period is measured and the balancer 226 determines that the minimum amount of IO jobs in-flight during the 30 ms sequence is 50. In this example the threshold could be set 50. Thereafter any 30 ms sequences of IO jobs where the minimum amount of concurrently in-flight jobs drops below 50, or alternatively 0.8*50, would not be qualified as a completion sequence. As the hardware starts to process more jobs concurrently the more likely the sequence will reflect how the hardware device is completing IO jobs to maximize its throughput and these sequences will provide more accurate information about the hardware device.

Continuing with the description of FIG. 7, operation 728 shows determining, over a predefined time period, that a minimum amount of IO jobs that are concurrently in-flight to the hardware device have not exceeded a qualification threshold; and reducing the qualification threshold. For example, in certain embodiments of the present disclosure the minimum amount of IO jobs that is set as the qualification threshold can also be associated with a time stamp. In this example, the qualification threshold can be ramped down over, for example, 5 minutes if no completion sequences are received that qualify. In this example the qualification threshold can be thought of as a high water mark and over time the balancer 226 can use completion sequences that are not as good. In one embodiment the standard can be lowered in order to use relatively decent completion sequences that may be useful to provide information about the hardware. For example, the hardware device may have changed and it has different operating characteristics. In this example the qualification threshold can be ramped down by using the high water mark value multiplied by a scalar such as 0.8 every 30 seconds until the qualification threshold is reduced to 1. In an alternative implementation the qualification threshold can be reduced based on a timestamp collected for the last threshold, the current time, and information that indicates that the qualification threshold is to be reduced to 1 over a period of time such as 5 minutes.

Figure 8:
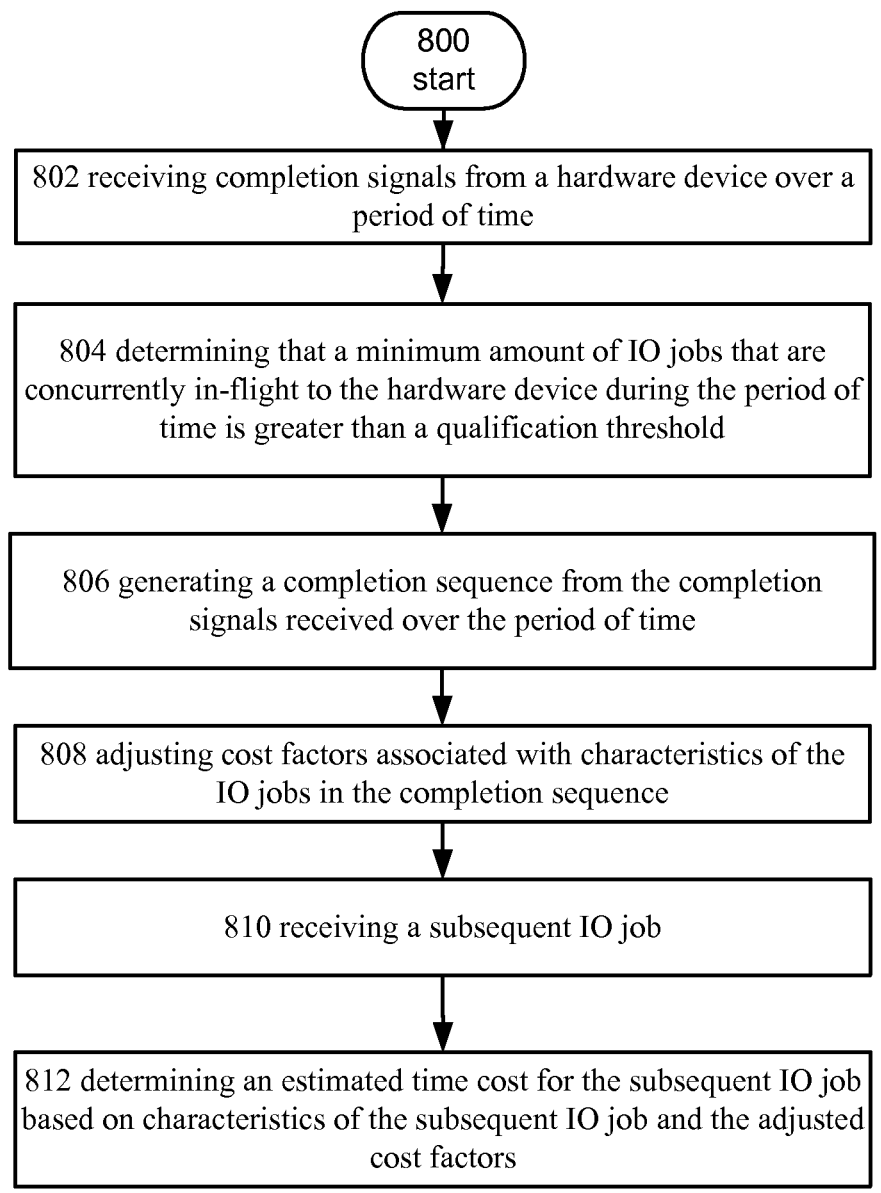
FIG. 8 illustrates an example operational procedures for generating a completion sequence.

Referring now to FIG. 8 it illustrates example operational procedures for generating a completion sequence including operations 800-812. Operation 800 begins the operational procedure and operation 802 shows receiving completion signals from a hardware device over a period of time. For example, in embodiments of the present disclosure the balancer 226 can receive completion signals over a period of time such as 30 ms. In other embodiments the period of time can be lower or greater based on a balance between processor utilization and the desire to more accurately estimate characteristics of an IO job. For example, in an embodiment the period of time may be 1 ms, however setting the period of time to such a small interval may require the processor 212 to be interrupted too often thereby reducing processor efficiency. Also in an implementation it may be costly to frequently read the current value of a high resolution timer.

Continuing with the description of FIG. 8, operation 804 illustrates determining that a minimum amount of IO jobs that are concurrently in-flight to the hardware device during the period of time is greater than a qualification threshold. For example, in an embodiment of the present disclosure a completion sequence can be generated from completion signals received over a time period, however in certain embodiments the balancer 226 may require that at least a minimum amount of IO jobs be in flight to the hardware in order for the completion sequence to 'qualify' for use. For example and as described above, hardware devices such as storage device 208 operate more efficiently when they have more IO jobs to choose from, that is, a hardware device 208 having more IO jobs in an internal buffer can determine when to execute each IO job in a way that maximizes throughput. Thus, in certain embodiments it is desirable to use completion sequences to estimate cost factors in situations where the hardware device is operating efficiently.

Continuing with the description of FIG. 8, operation 806 illustrates generating a completion sequence from the completion signals received over the period of time. In this example, since the qualification threshold is exceeded for this period of time, e.g., over the last 30 ms period the minimum amount of IO jobs never dropped below the qualification threshold, the balancer 226 can use this time period as a completion sequence, and store a summary of the completion sequence.

Continuing with the description of FIG. 8, operation 808 illustrates adjusting cost factors associated with characteristics of the IO jobs in the completion sequence. For example, the estimated time cost can be compared to the duration of the completion sequence. The difference can then be used to adjust the cost factors that are associated with the IO job characteristics. In one embodiment a running numeric approximation of a least difference fit can be used to adjust the cost factors. In this example the actual time duration, e.g., the total time cost for IO jobs in the completion sequence can be compared to the estimate of the total IO time cost for the completion sequence. This leads to an actual cost and an estimated cost. In example embodiments the estimated cost may be lower or higher than the actual cost which means that one or more cost factors are too low or too high. In this example the cost factors can be adjusted so that the estimated cost for the completion sequence is closer to the actual cost for the completion sequence. In another example embodiment the cost factors themselves can be adjusted based on a given characteristic's determined influence on the difference between the estimated total time for the completion sequence and the actual time for completing the IO jobs in the completion sequence.

In at least one implementation the cost factors can be adjusted so that the estimate of the completion sequence moves an amount equal to a percentage of the difference in order to slowly converge on the actual estimate. For example, the relative influence a given cost factor may have on the estimate may be incorrectly determined from a given completion sequence and so by moving the estimate a percentage closer to the actual an incorrect estimate outlaying measurement would not have a drastic affect on future estimates and allows the balancer 226 to slowly converge on a more accurate estimate of an IO job's time cost. In this, and other embodiments the adjustments can be made over time to avoid having cost factor estimates drastically change from one completion sequence to the next. In one example implementation the averaging can be implemented by storing a copy of the 40 latest completion sequence, e.g., measured duration and cost source totals difference and cost factors, and reevaluate the last 40 completion sequences to update the cost factors on a periodic basis.

Continuing with the description of FIG. 8, operation 810 illustrates receiving a subsequent IO job. For example, and referring to FIG. 2 and/or FIG. 3, the balancer 226 can receive an IO job from a client such as, for example, virtual machine 216. In an embodiment the processor 212 can execute instructions indicative of the root partition 204 and the balancer 226. The balancer 226 can have a memory location that is shared with the virtual machine 216, e.g., a ring buffer or a self overwriting memory location. The IO job in this example can be a job for a storage device 208, e.g. a read, write, a flush, etc., a job for a NIC 210, e.g. a request to send one or more packets of information, or a draw command for a graphics card. In this example the balancer 226 can access the shared memory location and receive information that identifies the request and, for example, a pointer to the data. In an embodiment where the balancer 226 is embedded within the hardware device the IO request could be received from the device driver 224. In this example, information that identifies which client the request is associated with can be sent to the hardware device. In yet another implementation the balancer 226 can be effectuated by instructions that are a part of the hypervisor 202. In this example the client can place the request in the shared memory location and the hypervisor 202 can be executed and the job can be passed to the balancer 226.

Continuing with the description of FIG. 8, operation 812 illustrates determining an estimated time cost for the subsequent IO job based on characteristics of the subsequent IO job and the adjusted cost factors. For example, in this embodiment the balancer 226 can identify the characteristics of the IO job and determine an estimated time cost for the IO job based on the current i.e., recent cost factors. Once the balancer 226 generates an estimate, the IO job can be stored in the balancer queue or sent to the hardware device and the estimate can be stored in memory.

Figure 9:
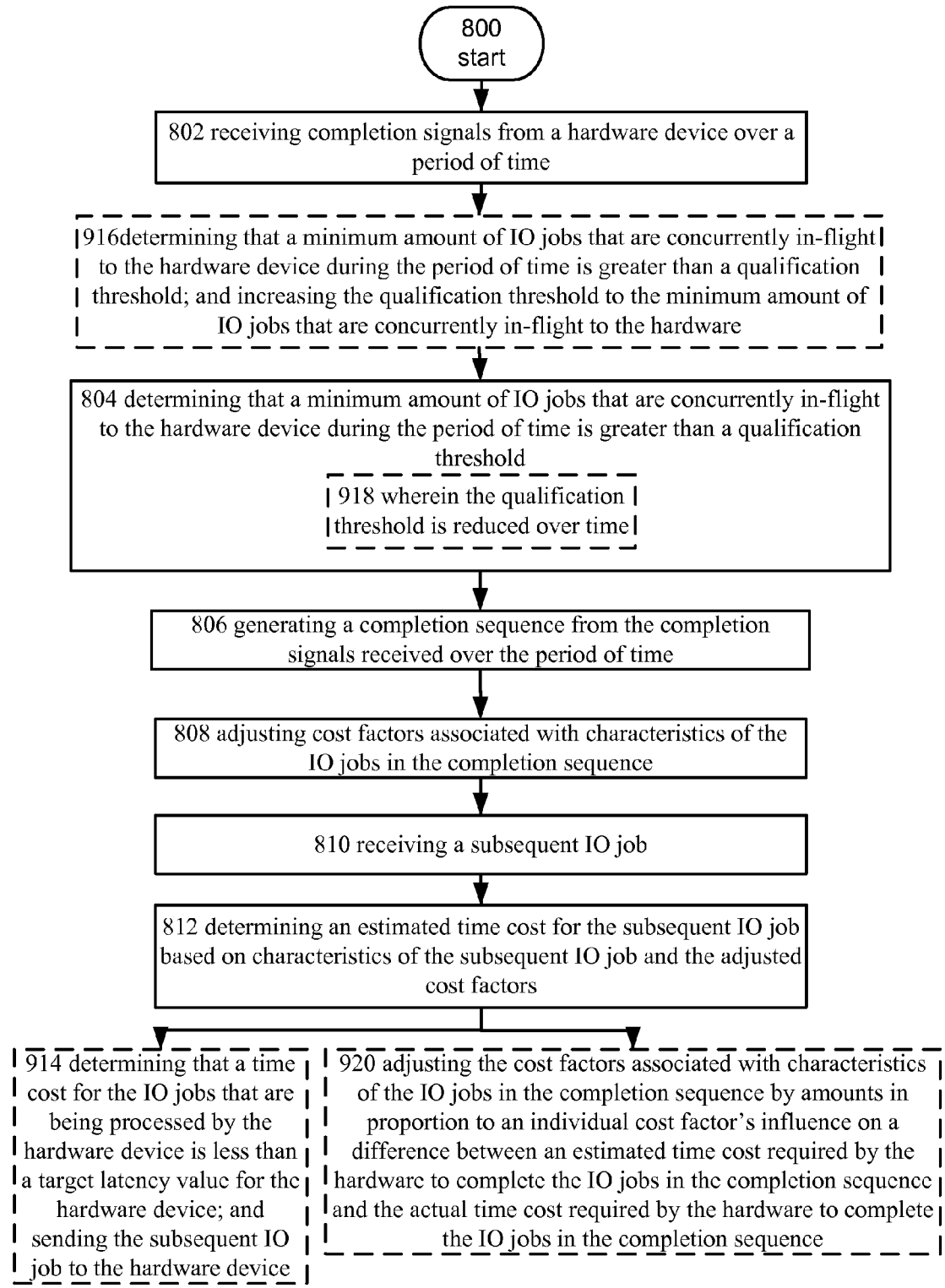
FIG. 9 illustrates an alternative embodiment of the operational procedure 800 of FIG. 8.

Referring now to FIG. 9, it illustrates an alternative embodiment of the operational procedure 800 of FIG. 8 including the additional optional operations 914, 916, 918 and 920. Referring to operation 914, it illustrates determining that a time cost for the IO jobs that are being processed by the hardware device is less than a target latency value for the hardware device; and sending the subsequent IO job to the hardware device. For example, the balancer 226 can be executed by a processor 212 and the processor 212 can determine a target latency value for the hardware device. In an embodiment the target latency value can be a time value that is associated with the saturation point of the hardware device. In a specific embodiment, the target latency value can be stored in a memory location, e.g., ROM of the hardware device, RAM of a computer system 200, etc., and can be retrieved by the balancer 226.

The balancer 226 can compare the target latency to the amount of IO jobs that are currently in flight to the hardware device and determine that the target latency has not been met. That is, a determination that the hardware device does not have enough time cost in flight to keep the hardware device saturated can be made. Similar to that described above, the balancer 226 can send the subsequent IO job to the hardware device and increase a time value indicative of the estimated time cost of the total IO job that are in flight to the hardware device by the estimated time cost of the subsequent IO job.

Continuing with the description of FIG. 9, operation 916 shows determining that a minimum amount of IO jobs that are concurrently in-flight to the hardware device during the period of time is greater than a qualification threshold; and increasing the qualification threshold to the minimum amount of IO jobs that are concurrently in-flight to the hardware. For example, in an embodiment the qualification threshold could be as low as 1 IO job in flight during the period of time where the completion sequence is obtained, however in this example embodiment the balancer 226 can be configured to increase the qualification threshold based an increased amount of IO jobs concurrently in flight while other completion sequences are being computed. For example, a first 30 ms period is measured by the balancer 226 and the minimum amount of IO jobs in-flight during the 30 ms sequence is 1. The next 30 ms period is measured and the balancer 226 determines that the minimum amount of IO jobs in-flight during the 30 ms sequence is 50. In this example the threshold could be set from 1 to 50. Thereafter any 30 ms sequence of IO jobs where the minimum amount of concurrently in-flight jobs drops below 50 would not be qualified as a completion sequence. As the hardware starts to process more jobs concurrently the more likely the sequence will reflect how the hardware device is completing IO jobs to maximize its throughput and these sequences will provide more accurate information about the hardware device.

Continuing with the description of FIG. 9, operation 918 shows wherein the qualification threshold is reduced over time. For example, in certain embodiments of the present disclosure the minimum amount of IO jobs that is set as the qualification threshold can also be associated with a time stamp. In this example, the qualification threshold can be ramped down over, for example, 5 minutes if no completion sequences are received that qualify. In this example the qualification threshold can be thought of as a high water mark and over time the balancer 226 can use completion sequences that are not as good. In one embodiment the standard can be lowered in order to use relatively decent completion sequences that may be useful to provide information about the hardware. For example, the hardware device may have changed and it has different operating characteristics. In this example the qualification threshold can be ramped down by using the high water mark value multiplied by a scalar such as 0.8 every 30 seconds until the qualification threshold is reduced to 1.

Continuing with the description of FIG. 9, operation 920 shows adjusting the cost factors associated with characteristics of the IO jobs in the completion sequence by amounts in proportion to an individual cost factor's influence on a difference between an estimated time cost required by the hardware to complete the IO jobs in the completion sequence and the actual time cost required by the hardware to complete the IO jobs in the completion sequence. For example, in an embodiment the characteristics of the completion sequence can be associated with cost factors and the factors can be adjusted based on their influence on the difference between the actual time cost for the IO jobs in the sequence and the estimated time cost for the IO jobs in the completion sequence. In one embodiment this adjustment can be made using techniques described above with respect to operation 720 or in other embodiments the cost factors can be adjusting using a feed-forward backpropagation neural network. In this example the neural network can accept inputs indicative of the characteristics of the completion sequence and a total time duration can be the output. A correction signal can be generated based on the total time duration and the estimated time duration. From the correction signal the different cost factors can be adjusted and stored in memory.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method for maximizing hardware throughput, comprising:
   estimating time cost values for a plurality of IO jobs from a completion sequence, the time cost equal to an estimated amount of time a hardware device will take to process a given IO job;
   determining a target latency value for the hardware device;
   determining an in-flight time cost value, the in-flight time cost value indicative of the time cost for IO jobs that are being processed by the hardware device; and
   sending an amount of IO jobs to the hardware device, the amount having a combined time cost value operable to increase the in-flight time cost to at least the target latency value.

2. The method of claim 1, wherein the target latency value is a fixed value.

3. The method of claim 1, wherein the target latency value is a dynamically determined value.

4. The method of claim 1, wherein the target latency value is for sequential IO jobs.

5. The method of claim 1, wherein the target latency value is for random IO jobs.

6. A computer system configured to assign a time cost value to an IO job, the computer system comprising:
   circuitry for storing a completion sequence, the completion sequence associated with completion signals for a plurality of IO jobs;
   circuitry for determining an estimated time cost for the IO jobs in the completion sequence, the time cost equal to an amount of time the hardware device was estimated to require in order to process the IO jobs in the completion sequence, the time cost calculated from characteristics of the IO jobs in the completion sequence modified by cost factors for the characteristics of the IO jobs;
   circuitry for adjusting the cost factors for the characteristics of the IO jobs based on a comparison between the estimated time cost and a duration of the completion sequence;
   circuitry for receiving a subsequent IO job; and
   circuitry for determining the estimated time cost for the subsequent IO job based on characteristics of the IO job and the adjusted cost factors for the characteristics of the IO job.

7. The computer system of claim 6, wherein the cost factors include a cost factor associated with the number of bytes in the completion sequence.

8. The computer system of claim 6, wherein the cost factors include a cost factor associated with a number of flow switches in the completion sequence.

9. The computer system of claim 6, wherein the cost factors include a cost factor associated with the number of seeks in the completion sequence.

10. The computer system of claim 6, wherein the cost factors include a cost factor associated with the number of IO jobs in the completion sequence.

11. The computer system of claim 6, wherein the hardware device is a network adaptor.

12. The computer system of claim 6, wherein adjusting the cost factors based on the comparison further comprises:
    circuitry for adjusting the cost factors by amounts in proportion to an individual cost factor's influence on a difference between the estimated time cost and the actual time cost.

13. The computer system of claim 6, further comprising:
    circuitry for determining that a minimum amount of IO jobs that are concurrently in-flight to the hardware device during a period of time is greater than a qualification threshold;
    circuitry for storing completion signals received from the hardware device; and
    circuitry for generating a completion sequence from the completion signals.

14. The computer system of claim 6, further comprising:
    circuitry for determining that a minimum amount of IO jobs that are concurrently in-flight to the hardware device during the period of time is greater than a qualification threshold; and
    circuitry for increasing the qualification threshold to the minimum amount of IO jobs that are concurrently in-flight to the hardware.

15. The computer system of claim 6, further comprising:
    circuitry for determining, over a predefined time period, that a minimum amount of IO jobs that are concurrently in-flight to the hardware device have not exceeded a qualification threshold; and
    circuitry for reducing the qualification threshold.

16. A computer readable hardware memory including computer executable instructions generating a completion sequence, the computer readable hardware memory comprising:
    instructions for receiving completion signals from a hardware device over a period of time;
    instructions for determining that a minimum amount of IO jobs that are concurrently in-flight to the hardware device during the period of time is greater than a qualification threshold;
    instructions for generating a completion sequence from the completion signals received over the period of time;
    instructions for adjusting cost factors associated with characteristics of the IO jobs in the completion sequence;
    instructions for receiving a subsequent IO job; and
    instructions for determining an estimated time cost for the subsequent IO job based on characteristics of the subsequent IO job and the adjusted cost factors.

17. The computer readable hardware memory of claim 16, further comprising:
    instructions for determining that a time cost for the IO jobs that are being processed by the hardware device is less than a target latency value for the hardware device; and
    instructions for sending the subsequent IO job to the hardware device.

18. The computer readable hardware memory of claim 16, further comprising:
    instructions for determining that a minimum amount of IO jobs that are concurrently in-flight to the hardware device during the period of time is greater than a qualification threshold; and
    instructions for increasing the qualification threshold to the minimum amount of IO jobs that are concurrently in-flight to the hardware.

19. The computer readable hardware memory of claim 16, wherein the qualification threshold is reduced over time.

20. The computer readable hardware memory of claim 16, wherein adjusting cost factors associated with characteristics of the IO jobs in the completion sequence further comprises:

instructions for adjusting the cost factors associated with characteristics of the IO jobs in the completion sequence by amounts in proportion to an individual cost factor's influence on a difference between an estimated time cost required by the hardware to complete the IO jobs in the completion sequence and the actual time cost required by the hardware to complete the IO jobs in the completion sequence.

\* \* \* \* \*

UNITED STATES PATENT AND TRADEMARK OFFICE
CERTIFICATE OF CORRECTION

| | | |
|---|---|---|
| PATENT NO. | : 8,479,214 B2 | Page 1 of 1 |
| APPLICATION NO. | : 12/242621 | |
| DATED | : July 2, 2013 | |
| INVENTOR(S) | : Green et al. | |

It is certified that error appears in the above-identified patent and that said Letters Patent is hereby corrected as shown below:

In the Specification

In column 6, line 67, delete "the a" and insert -- the --, therefor.

Signed and Sealed this
Nineteenth Day of May, 2015

Michelle K. Lee
*Director of the United States Patent and Trademark Office*